United States Patent Office 2,957,914
Patented Oct. 25, 1960

2,957,914
N-ALKYLATED FLUORINATED ACRYLAMIDE MONOMERS

Benjamin D. Halpern, Wolf Karo, and Philip Levine, Leominster, Mass., assignors to Monomer-Polymer, Inc., Leominster, Mass., a corporation of Massachusetts No Drawing. Filed Dec. 28, 1954, Ser. No. 478,182

6 Claims. (Cl. 260—561)

This invention relates to new monomers of the acrylamide type which contain fluorine. It also relates to new polymers formed therefrom which have unusually high solvent resistance.

In accordance with this invention 1,1 dihydroperfluoroalkyl amines and their N-alkyl derivatives are reacted with an acrylyl or methacryly halide in a nitrogen atmosphere and icesalt bath to yield novel fluorinated acrylamide type monomers.

Preparation of the amine and N-alkyl amines are accomplished by reacting the corresponding amide with lithium aluminum hydride. The preparation of such amides and amines are described in two co-pending applications of Halpern and Karo entitled respectively "N-alkylperfluorbutyramides," Ser. No. 462,390; and "N-alkyl 1,1 diphydroheptafluorobutylamines," Ser. No. 465,122; both applications now having been abandoned.

An example of this invention is the preparation of N-n-butyl-N-1,1 dihydroheptafluorobutylacrylamide.

EXAMPLE 1

A solution is prepared of 64 g. (0.25 mol) of N-n-butyl 1,1-dihydroheptafluorobutylamine in 50 ml. of anhydrous ether and 25.1 g (0.25 mol) of triethylamine. To this solution is added over a half-hour period a solution of 22.6 g (0.25 mol) of acrylyl chloride (uninhibited) in 50 ml. of anhydrous ether. The exothermic reaction is controlled by slow addition or use of an ice-salt bath. A nitrogen atmosphere is preferred. After completion of reaction the mixture is stirred for an additional half hour at room temperature and then filtered. The filtrate and washes are evaporated and the residue distilled to yield N-n-butyl-N-1,1 dihydroheptafluorobutylacrylamide having a boiling point of 111° C. at 14 mm. Hg in a yield of about 53%.

In the above example where methacrylyl chloride is substituted for acrylyl chloride the product is N-n-butyl-N-1,1 dihydroheptafluorobutylmethacrylamides.

By the same process the following acrylamides and methacryl amides were prepared:

N-1,1-dihydroheptafluorobutylacrylamide
N-methyl-N-1,1-dihydroheptafluorobutylacrylamide
N-methyl-N-1,1 - dihydroheptafluorobutylmethacrylamide
N-ethyl-N-1,1-dihydroheptafluorobutylacrylamide
N-ethyl-N-1,1-dihydroheptafluorobutylmethacrylamide
N-iso-butyl-N-1,1-dihydroheptafluorobutylacrylamide
N-iso-butyl - N - 1,1 - dihydroheptafluorobutylmethacrylamide
N,N-di-(1,1-dihydroheptafluorobutyl)methacrylamide Our alkyl fluoroalkyl amides of the selected acrylic acid, i.e., acrylic or methacrylic acid, are of the following formula

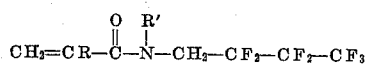

$$CH_2=CR-\overset{O}{\overset{\|}{C}}-\overset{R'}{\overset{|}{N}}-CH_2-CF_2-CF_2-CF_3$$

in which R is selected from the group consisting of hydrogen and methyl and R' is an unsubstituted alkyl radical having 1–4 carbon atoms.

The properties of these fluorinated monomers are given below:

*Properties of N-alkyl-N-1,1-dihydroheptafluorobutylacrylamides*

| Alkyl Substituent | Boiling Point, °C./mm. Hg | Melting Point, °C. | Refractive Index, $n_D^{20}$ | Density, $d_{25}$, g./ml. | Analysis | | | | Percent Nitrogen | |
| | | | | | Percent Carbon | | Percent Hydrogen | | | |
| | | | | | Calc. | Found | Calc. | Found | Calc. | Found |
|---|---|---|---|---|---|---|---|---|---|---|
| Hydrogen | | | 57.4–57.6 | | | 33.21 | 33.4 | 2.4 | 2.5 | 5.5 | 5.6 |
| Methyl | 79 | 11 | appr. 20 | | | 36.0 | 36.6 | 3.0 | 3.8 | 5.2 | 5.2 |
| Ethyl | 95 | 15 | | 1.3829 | 1.350 | 38.4 | 38.4 / 38.3 | 3.6 | 4.0 / 4.9 | 4.9 | 5.3 / 4.9 |
| n-Butyl | 112 | 15 | | 1.3930 | 1.267 | 42.7 | 43.1 | 4.6 | 4.7 | 4.5 | 5.0 |
| iso-Butyl | 107 | 15 | | 1.3901 | | 42.7 | 43.2 / 43.5 / 44.0 | 4.6 | 4.7 / 4.8 / 7.1 | 4.5 | 5.0 / 5.0 / 4.7 |

*Properties of N - alkyl-1,1-dihydroheptafluorobutylmethacrylamides*

| Alkyl Substituent | Boiling Point, °C./mm. Hg | | Refractive Index, $n_D^{25}$ | Density, $d_{25}$, g./ml. |
|---|---|---|---|---|
| Methyl | 77 | 8 | 1.3763 | 1.325 |
| Ethyl | 107 | 29 | a 1.3844 | 1.269 |
| n-Butyl | 114 | 11 | b 1.3906 | |
| iso-Butyl | 90 | 5 | b 1.3947 | |
| 1,1-dihydroheptafluorobutyl | 41–89 | 24 | | | a Refractive index taken at 25°.
b Appr. refractive index, material seemed to be near its melting point. It was not possible to get a clear liquid for this determination.

Each of the above compounds was found to be polymerizable by usual means to give homopolymers and hetero-polymers having a much higher resistance to oils and other solvents than the corresponding non-fluorinated acrylamides and methacrylamides. Thus, for example, each of these compounds was polymerized in aqueous suspension (25–75% solids) with 1% starch and 0.01 to 0.1% benzoyl peroxide at 80° C. for 2–3 hours to give rubber-like compounds highly resistant to oils, ester solvents, aromatic hydrocarbons and heat. Further, these rubber-like polymers could be compounded with carbon black and given a di-amine-sulfur cure.

In addition to the compounds having the 1,1-dihydroheptafluorobutyl radical, this invention includes generally those compounds having alkyl groups where all the hydrogens except two in the 1,1 position are replaced by fluorine. These for example include 1,1-dihydrofluoromethyl, 1,1-dihydrotrifluoroethyl, 1,1-dihydro-heptafluoro isobutyl, and 1,1-dihydropentafluoropropyl.

We claim:

1. An amide of an acrylic acid of the formula

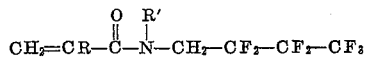

in which R is selected from the group consisting of hydrogen and methyl and R' is an unsubstituted alkyl radical having 1–4 carbon atoms.

2. The amide of claim 1 in which R is hydrogen.
3. The amide of claim 1 in which R is methyl.
4. The new compound N-ethyl-N-1,1-dihydroheptafluorobutylacrylamide.
5. The new compound N-isobutyl-N-1,1-dihydroheptafluorobutylacrylamide.
6. The new compound N-n-butyl-N-1,1-dihydroheptafluorobutylmethacrylamide.

References Cited in the file of this patent

UNITED STATES PATENTS

| | | |
|---|---|---|
| 2,401,885 | Semon | June 11, 1946 |
| 2,521,902 | Coover et al. | Sept. 12, 1950 |
| 2,691,043 | Husted et al. | Oct. 5, 1954 |
| 2,701,814 | Smith | Feb. 8, 1955 |
| 2,743,297 | Husted et al. | Apr. 24, 1956 |